United States Patent
Weber et al.

(10) Patent No.: US 6,922,431 B1
(45) Date of Patent: Jul. 26, 2005

(54) COMMUNICATION USING SPREAD SPECTRUM METHODS OVER OPTICAL FIBERS

(75) Inventors: Jean-Pierre Weber, deceased, late of Overijse (BE); by Paul Weber, legal representative, Overijse (BE); Per-Olov Granestrand, Tyresö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/126,897

(22) Filed: Jul. 31, 1998

(30) Foreign Application Priority Data

Jul. 31, 1997 (SE) ................................. 9702843

(51) Int. Cl.⁷ ................................. H04B 1/69
(52) U.S. Cl. ................................. 375/130
(58) Field of Search ................................. 375/130, 146, 375/147, 260; 359/109; 381/4; 370/522, 524, 527, 529; 398/77, 78, 141, 183

(56) References Cited

U.S. PATENT DOCUMENTS

| | | | |
|---|---|---|---|
| 4,335,463 A | | 6/1982 | Foucard |
| 4,930,140 A | | 5/1990 | Cripps et al. |
| 4,959,826 A | | 9/1990 | Smith |
| 5,276,704 A | | 1/1994 | Dixon |
| 5,365,544 A | | 11/1994 | Schilling |
| 5,370,114 A | * | 12/1994 | Wong et al. ................. 600/322 |
| 5,519,526 A | | 5/1996 | Chua et al. |
| 5,533,012 A | * | 7/1996 | Fukasawa et al. .......... 370/342 |
| 5,715,521 A | * | 2/1998 | Fukasawa et al. ............ 455/69 |
| 5,734,648 A | * | 3/1998 | Adachi et al. ............... 370/342 |
| 5,877,878 A | * | 3/1999 | Horiuchi et al. ............. 359/110 |
| 5,909,279 A | * | 6/1999 | Pepper et al. ............... 356/479 |
| 5,960,398 A | * | 9/1999 | Fuchigami et al. ......... 704/270 |
| 5,966,376 A | * | 10/1999 | Rakib et al. ................. 370/342 |
| 6,108,317 A | * | 8/2000 | Jones et al. ................. 370/320 |

FOREIGN PATENT DOCUMENTS

| | | | |
|---|---|---|---|
| EP | 0 240 14 | 10/1987 | |
| EP | 0 790 720 | 8/1997 | |
| GB | 2125253 | * 2/1984 | ................. 370/441 |
| GB | 2 125 253 | 2/1994 | |
| JP | 5-268658 | 10/1993 | |

OTHER PUBLICATIONS

Marhic, Michel E., "Coherent Optical CDMA Networks", *Journal of Lightwave Technology*, vol. 11, No. 5/6, May/Jun. 1993, pp854–864.

* cited by examiner

*Primary Examiner*—Kevin Burd
(74) *Attorney, Agent, or Firm*—Burns, Doane, Swecker & Mathis, L.L.P.

(57) ABSTRACT

In a fiberoptical network, for example in a LAN, spread spectrum modulation is used, for example, CDMA, by providing an electrical digital data signal to a spreading device including a multiplier also receiving the spreading code. Then a modulation is made of the spread signal at radio frequencies, the signal being multiplied by a subcarrier wave generated in a oscillator, whereby the data signal is carried on an RF subcarrier. A control channel signal from a control unit is added to the modulated signal, so that the control signal will be located in the baseband. The added signal is converted to an optical signal transmitted on an output fiber. The control channel signal can be TDMA-modulated using collision detection. Making spectrum spreading in the electrical domain allows the use of standard components developed for example for mobile telephone systems. No wavelength control and no optical filters are necessary, which allows a low cost system to be constructed. Alternatively, the spreadspectrum data signal can be located in the baseband and the control channel on a subcarrier or both the data and the control channel can be put on subcarriers.

18 Claims, 6 Drawing Sheets

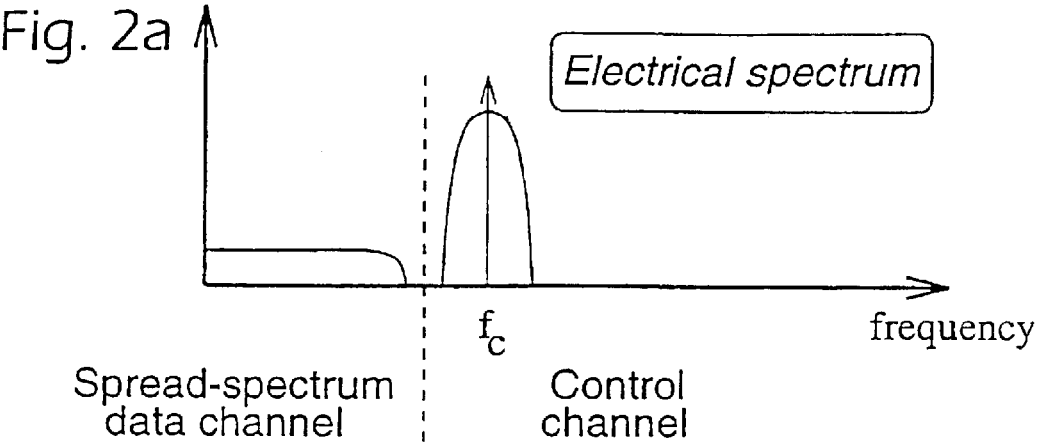
Fig. 2a *Electrical spectrum*
Spread-spectrum data channel | Control channel
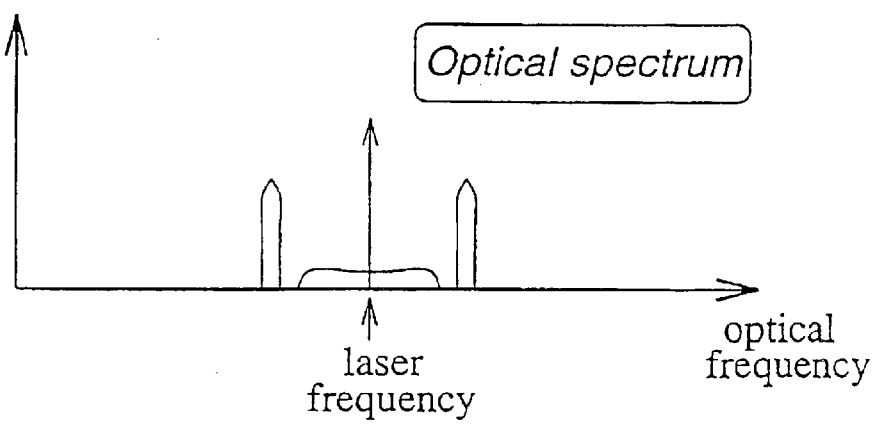
Fig. 2b *Optical spectrum*

Fig. 6a
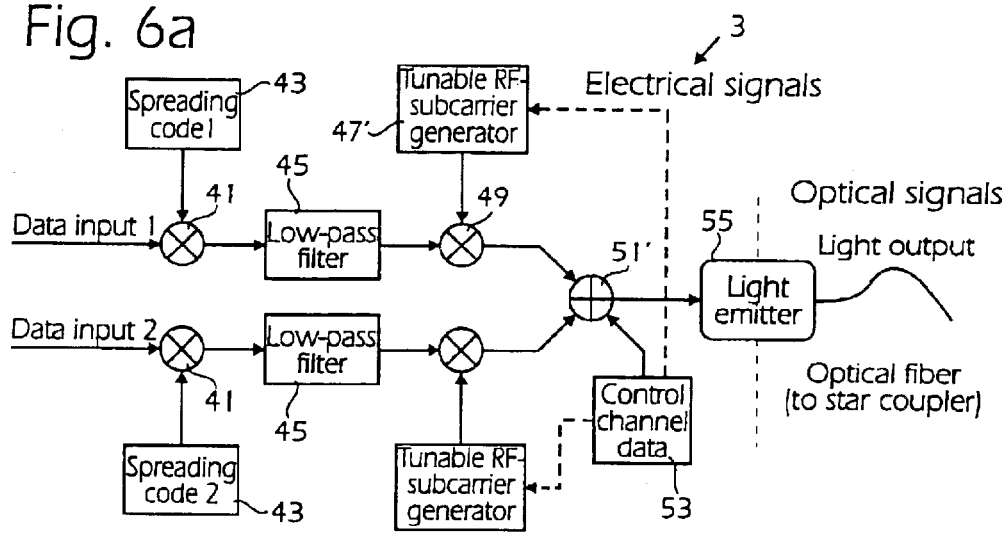
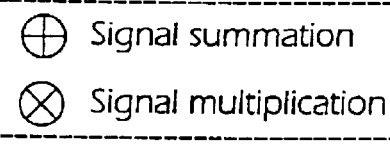
Fig. 6b
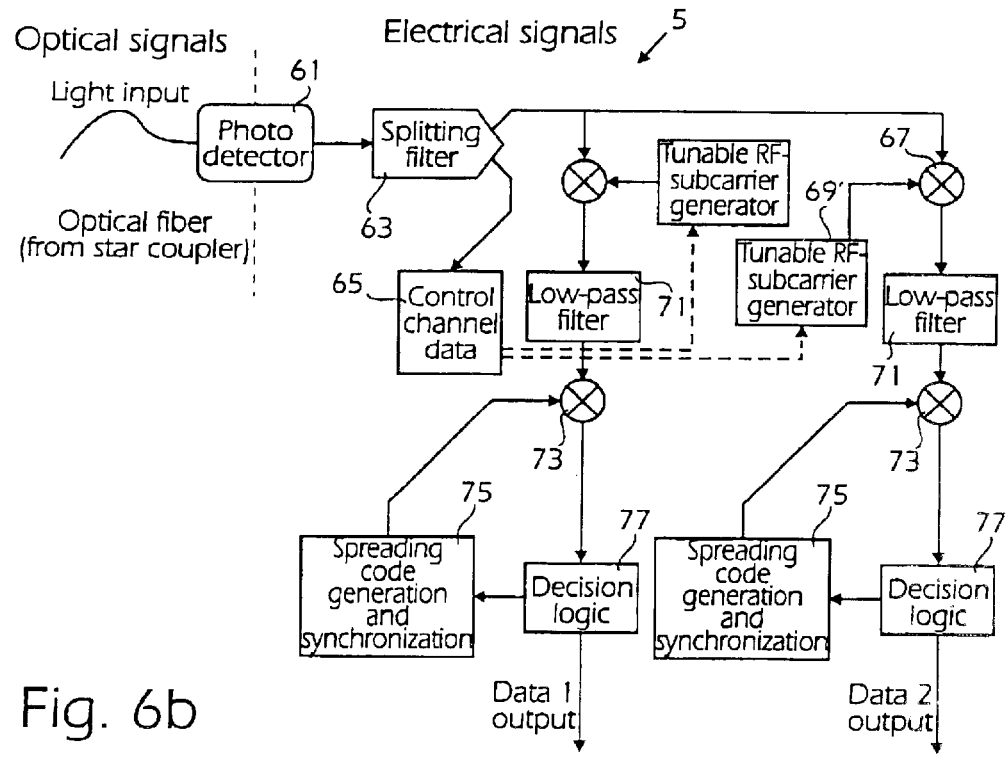

COMMUNICATION USING SPREAD SPECTRUM METHODS OVER OPTICAL FIBERS

The present invention relates to using spread spectrum methods in a fiberoptical network and also to fiberoptical networks using spread spectrum methods.

BACKGROUND

One problem met in local area networks (LANs) using time division multiple access (TDMA) is that when the number of users becomes large such as several hundreds on the same network the bit rate must be increased to provide sufficient bandwidths to all users. This results in that electronic circuits operating at fairly high speed must be used everywhere in the network, even if the actual bandwidth used by an individual node or terminal in the network is much smaller.

One way to alleviate this problem is to use wavelength division multiplexing (WDM) in a fiber-optical network but it can be costly since it usually means that tunable lasers, tunable filters and wavelength stabilization must be employed. Another solution which has been proposed is to use some form of spread-spectrum technique in the optical domain, see M. E. Marhic, "Coherent optical CDMA networks", J. Lightwave Technology, Vol. 11, No. 5/6, May/June 1993, pp. 854–864, the published European patent application 0 027 413 having the title "Système de transmission multiaccès integral simultanè sur ligne de transmission par fibres optiques" for J. Foucard, which corresponds to U.S. Pat. No. 4,335,463, the published European patent application 0 240 124 having the title "Lightwave communication system" for G. J. Foschini and G. Vannucci, U.S. Pat. No. 5,519,526 for P. Chaa et al. having the title "Optical protocols for communication networks". This is also called code division multiple access (CDMA). There are several problems related to the proposed solutions. They often require the use of short pulses and/or special devices for spectral encoding and decoding as in the solutions disclosed in the cited paper by Marhic and in the cited U.S. patent. These are not standard components and will thus be expensive. Another solution proposed in the cited European patent application 0 240 124 still requires a tunable optical filter to lock onto the emitting laser wavelength.

Most of the existing articles and patents, see for example the cited paper by Marhic, the cited European patent application 0 240 124 and U.S. Pat. No. 5,519,526, elaborating on the use of CDMA or spread-spectrum techniques for communication on optical fibers, use spreading of the optical spectrum. This means in general that the despreading also has to be done optically. It can be difficult and also expensive in terms of components. However, in the cited European patent application 0 027 413 a system is disclosed in which the spreading is done in the electrical domain, but in which the signal is kept in the baseband, without any subcarrier and/or control channel.

In the cited European patent application 0 240 124 the spreading is thus done in the optical domain, and although there is no wavelength control at the transmitter, a scanning tunable filter is required in the receiver to lock on an incoming signal and establish a connection.

In the cited U.S. Pat. No. 5,519,526 a spectral encoding of the optical signal is used which requires the use of very short pulses (to get enough spectral width) and a reconfigurable phase plate (for the spectral encoding). This will not be easy or cheap in practice.

The Japanese patent application JP 5/268658 discloses a system for transmission between an exchange station and plural base stations in a mobile telephone network using CDMA. The electrical RF signals from the exchange station are converted to optical form and transmitted on optical fibers to the antennas of the base stations.

In the published British patent application GB 2 125 253 a data communication system is disclosed using code division multiple access spread spectrum techniques. A message is modulated on to a quasi-random bit stream. The modulation technique used is also called pseudo-noise modulation and at the transmitter a modulated RF carrier is subjected to irregular phase reversals in a modulator. The reversals are controlled by a signal from a code generator producing a pseudo-random bit sequence, particular to each destination. The modulation data is superimposed on this bit sequence. The resulting waveform is applied to a balance modulator, which leaves the RF carrier unchanged for a 0 bit and produces a phase reversal for a 1 bit. The balance modulator is a liner driver, which can feed an optical fiber cable.

SUMMARY

It is an object of the invention to provide a method of transferring electrical digital signals over a fiberoptical network employing CDMA allowing use of standard, basically not too costly building elements, such as tunable lasers or filters.

It is another object of the invention to provide a fiberoptical network which is suitable for employment as a LAN and can be implemented using standard, basically not too costly building elements.

It is another object of the invention to provide a fiberoptical network in which a data channel to be used for setting up connections can be easily implemented.

It is another object of the invention to provide a fiberoptical network which can be constructed in a flexible way allowing smaller or higher capacities.

Thus, spread spectrum modulation is used, for example CDMA, in fiberoptical transmission, for example in a LAN, in which the modulation is made at radio frequencies followed by a conversion to optical signals instead of making a spread at light frequencies directly. A TDMA-modulated control channel is used and one or a plurality of CDMA-modulated or similarly modulated data channels.

The fact that spectrum spreading is done in the electrical domain allows the use of standard components which are now being developed, for example for mobile telephone systems using CDMA or some modified version thereof. Several different embodiments having varying performances, costs and complexities will then be possible. In the simplest one, no wavelength control and no optical filters are necessary, what allows a low cost system to be constructed.

The electrical data signal is thus multiplied by a spreading code, this method being called direct-sequence CDMA, and then the result is used to modulate an RF subcarrier. A control channel for establishing connections between two terminals can be implemented as a TDMA channel in the baseband using collision detection, for example using an "Ethernet" type protocol. An alternative is to keep the spread-spectrum data signal in the baseband and to put the control channel on a subcarrier. Another alternative is to put both the data and the control channel on subcarriers. In any case, the two signals are summed and the resulting or added signal is then used to modulate the intensity of a light emitting device having a sufficient bandwidth.

Generally thus, in a fiber-optical based local area network a control channel is provided, which uses TDMA with for example collision detection for setup of connections, the control channel being carried on one RF subcarrier and further one or several spread-spectrum data channels using CDMA or a similar spreading method on one or several other RF subcarriers. One of the subcarriers used, the term "subcarrier" being taken generally, can be the baseband. The connections can be point-to-point or in some cases broadcast. If several RF subcarriers are used for the data channels, each sub-carrier can have different bit-rates and code sequence lengths. In that case, several simultaneous connections from one terminal to several other terminals are also possible. No wavelength control of the light emitting devices is necessary.

A possible extension of this general approach is to use WDM. Then the available spectrum is divided in several wavelength bands, each carrying a full system as described above. The control channel will be common to all bands and can be allocated its own wavelength band.

The cited European patent application 0 027 413 discloses, as has been indicated above, a system employing spreading in the electrical domain and placing the signal in the baseband, not using a subcarrier and/or a control channel. The advantage of the system as described herein is the increased flexibility and capacity, especially when multiple subcarriers are used. For example, it allows the simultaneous connection of one terminal to several others, transmitting different data, using only one optical interface.

Thus, when transferring an electrical digital signal incoming to a first terminal from this terminal on an optical fiber to a second terminal, the signal can first be spread using a spread spectrum method, then modulated on a radio frequency subcarrier, i.e. an electric harmonic oscillation having a definite and fixed frequency, and finally converted to optical signals transmitted on the fiber to the second terminal, where substantially inverse operations are performed on the received optical signal in the inverse order to extract the original electrical digital signal.

More precisely, in the first terminal: the electrical digital signal is spread using some spread spectrum modulation method such as CDMA or frequency hopping to produce a spread spectrum modulated electrical signal, this spread spectrum modulated electrical signal is then modulated on a radio frequency subcarrier, e.g. by amplitude modulation, to produce a modulated subcarrier signal, this modulated subcarrier signal is used for modulating the amplitude of a monochromatic light wave to produce a modulated light wave, and this modulated light wave is transmitted on the optical fiber to the second terminal. In the second terminal: the modulated light wave received on the optical fiber is converted to an electrical signal by sensing the optical power and producing an electrical signal having a magnitude equal to that power, this electrical signal is demodulated at the frequency of the radio frequency subcarrier to produce a demodulated spread spectrum electrical signal, and this demodulated spread spectrum electrical signal is despread using the despreading method corresponding to the spread spectrum method used in the first terminal to produce a digital electrical signal corresponding to the electrical digital signal incoming to the first terminal.

A network according to the discussion above will then comprise at least two terminals, which are connected by an optical fiber. Generally then, a control channel is carried on one RF subcarrier and at least one spread-spectrum data channel produced by using a spread spectrum method is carried on a different one or on different ones respectively of RF subcarriers, the RF subcarriers here being taken in a generalized meaning, so that one of the subcarriers used can be the baseband, i.e. have a frequency equal to zero.

A transmitter or transmitting means in a terminal can then comprise, for the case of the data channel on a subcarrier: spreading means for spreading a first electrical digital signal using a spread spectrum method to produce a spread electrical signal, the spreading means comprising for direct-sequence CDMA a multiplier and a generator of spreading code signals; modulating means connected to the spreading means for modulating the spread electrical signal on a radio frequency subcarrier having a non-zero frequency, which suitably is a rather high frequency, in the order of hundreds of MHz, to produce a modulated electrical signal, the modulating means comprising e.g. a multiplexer or mixer and an RF oscillator, and; converting means connected to the modulating means for modulating the modulated electrical signal on a light wave to produce an optical signal and connected to the optical fiber for transmitting the optical signal on the optical fiber.

For the control channel, the transmitting means can further comprise summing or adding means connected between the modulating means and the converting means and having a first input connected to the modulating means and an output connected to the converting means. A second input of the adding means is connected to receive a second electrical digital signal which is then added to the modulated signal before it is modulated by the converting means.

The receiver or receiving means can in the same case comprise: converting means connected to the optical fiber for receiving an optical signal for converting the optical signal, in particular the power thereof, to an electrical signal; demodulating means connected to the converting means for demodulating the electrical signal into a demodulated electrical signal, and; despreading means connected to the demodulating means for despreading the demodulated electrical signal using a spread spectrum method to produce a despread electrical signal corresponding to the first electrical digital signal, the spread spectrum method corresponding to that used in the transmitter means, the direct-sequence CDMA case using the same spreading code for the despreading.

For the data channel, the receiving means can further comprise splitting means connected between the converting means and the demodulating means having an input connected to the converting means. The splitting means will split the electrical signal converted from the received light signal into a low frequency electrical signal, that corresponds to the second electrical digital signal and is provided on a first output of the splitting means, and a high frequency electrical signal provided on a second output of the splitting means, the second output being connected to the demodulation means.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 2a is a diagram of the electrical spectrum of another, simple basic system having the spread-spectrum data signal carried in the baseband and the control channel carried on an RF subcarrier, FIG. 2b is a diagram of the optical spectrum resulting from the electrical spectrum of FIG. 2a, if a single-mode laser is used and only one light transmitter is active, FIGS. 6a and 6b are schematic block diagrams of the principle of operation of a transmitter and a receiver respectively for a multiple connection system having multiple RF subcarriers using a baseband control channel and two possible simultaneous connections.

DETAILED DESCRIPTION

Figure 3:
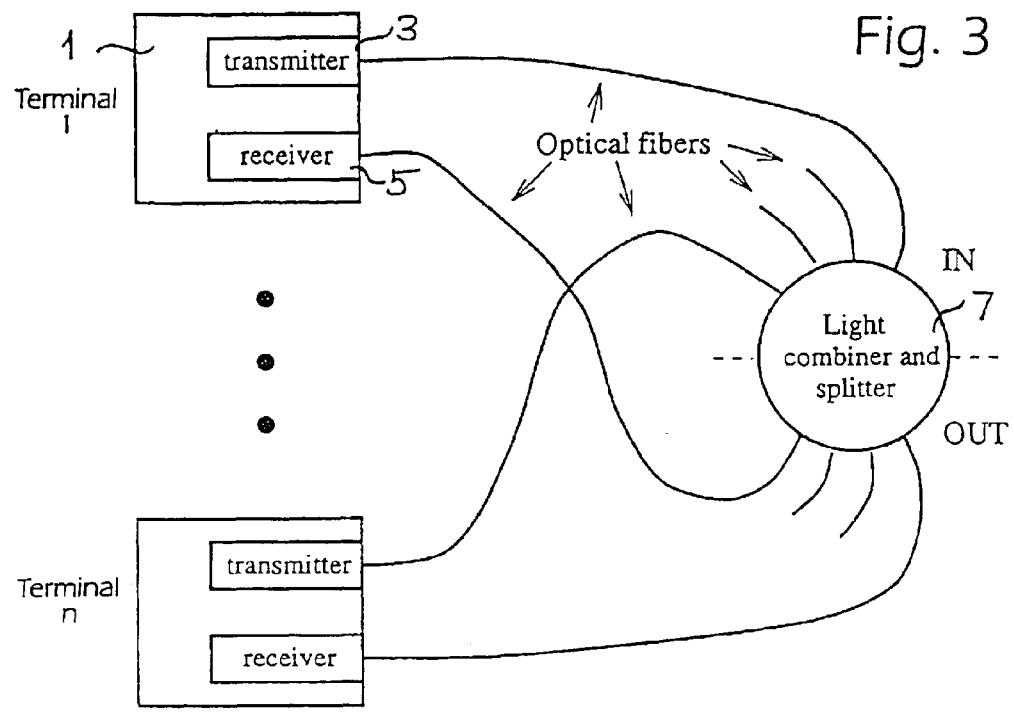
FIG. 3 is a schematic picture of a fiberoptical LAN using the modulation methods as outlined in FIGS. 1a and 1b or FIGS. 2a and 2b respectively.

In FIG. 3 a fiber-optical local area network is illustrated comprising a plurality of terminals 1. Each terminal 1 comprises a light transmitter 3 and a light receiver 5 connected to ends of respective optical fibers which at their other, opposite ends are connected to a star coupler 7, which comprises light combining and light splitting elements. A terminal 1 thus receives electrical signals from some source, not shown, also called a user, which are converted to suitable light signals and are transmitted by the transmitter 3 on the optical fiber connected to the transmitter, the light signals being routed in some way in the star coupler to another optical fiber connected to a receiver 5 in another terminal 1. This receiver 5 then converts the received light signals to suitable electrical signals which can be forwarded to some user, not shown.

Figure 1A:
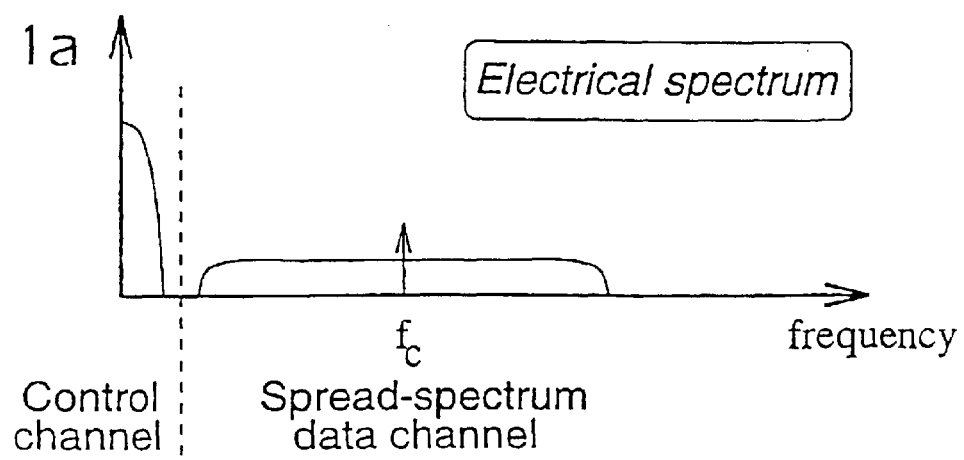
FIG. 1a is a diagram of the electrical spectrum of a simple, basic system having the spread-spectrum data signal carried on an RF subcarrier and a control channel in the baseband.

In the fiber-optical network illustrated in FIG. 3 spread spectrum modulation is used, in which an electrical data signal incoming to a terminal 1 can be multiplied with a spreading code, this method being called direct sequence CDMA, and the result is then used to modulate an RF subcarrier, see the diagram of FIG. 1a showing the electrical spectrum of signals to be transmitted in the network. A control channel for establishing or setting up connections between two terminals 1 is implemented as a TDMA channel using for example collision detection. The control channel can be carried in the baseband as illustrated by the spectrum of FIG. 1a. Alternatively, the data signal converted to a spread-spectrum electrical signal can be carried in the baseband and the control channel carried on a subcarrier, see the diagram of the electrical spectrum in FIG. 2a. Another alternative is to put both on subcarriers, this case not being illustrated in the drawings.

Figure 1B:
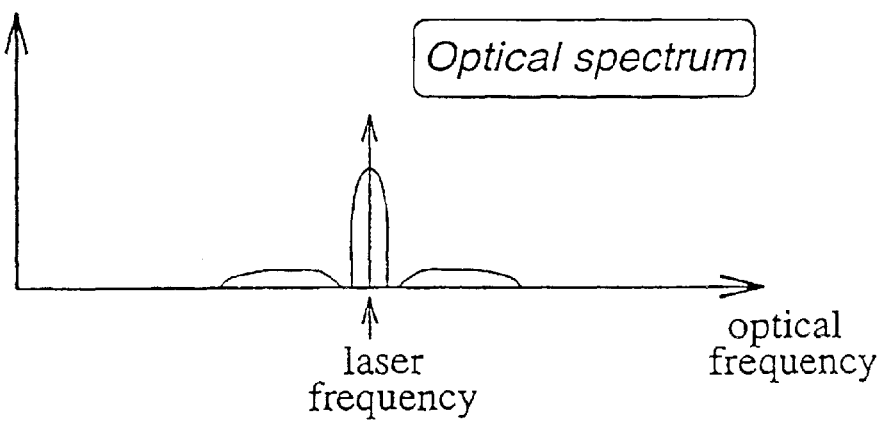
FIG. 1b is a diagram of the optical spectrum resulting from the electrical spectrum of FIG. 1a, if a single-mode laser is used and only one light transmitter is active.

The two signals are electrically summed and the resulting signal is then used to modulate the intensity of the light emitter 3 in the terminal which then must have a sufficient bandwidth corresponding to the modulation width. The resulting optical spectra are illustrated in the diagrams of FIGS. 1b and 2b.

Each receiver 5 has in the simplest implementation only one photo-detector to convert the incoming light to an electrical signal. An electrical filter can separate the data signal and the control channel. After down-conversion, if needed, and low-pass filtering, the desired signal is then selected by correlating with the corresponding code sequence, as in standard CDMA systems.

This establishes a one-directional channel which can be used for point-to-point transmission or for broadcast transmission. To establish a bi-directional connection between two terminals two such channels are required.

Several variants and extensions of the embodiments as described above are possible, having varying costs and resulting in varying characteristics and performances:

Instead of using direct sequence CDMA as described above, frequency hopping can be used or a combination of CDMA and frequency hopping.

To avoid storing spreading code information about every terminal 1 in the network, the terminals can exchange that information during set-up of a connection, using the control channel.

Several RF subcarrier frequencies can be used what requires multiple spreading and modulating devices in the transmitters 3 and multiple despreading and demodulating devices in the receivers 5. This can allow simultaneous connections from one terminal 1 to a plurality of other terminals 1.

Different bit-rates can be used with different subcarriers.

The network capacity can be increased by using WDM and then several wavelength bands can be defined. In that case the control channel may have its own wavelength band.

In the following several possible implementations of the general principles described above will be discussed. In general, the more complex implementations will have a higher performance, but will also be more costly. One of the main parameters to be considered for system design will be the desired or available bandwidth.

Figure 4A:
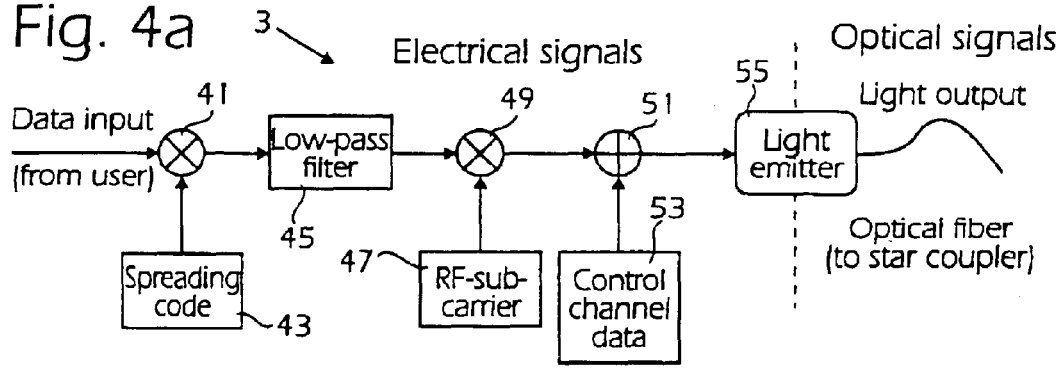
FIGS. 4a and 4b are schematic block diagrams of the principle of operation of a transmitter and a receiver respectively for a simple, basic system having a control channel in the baseband.
Figure 4B:
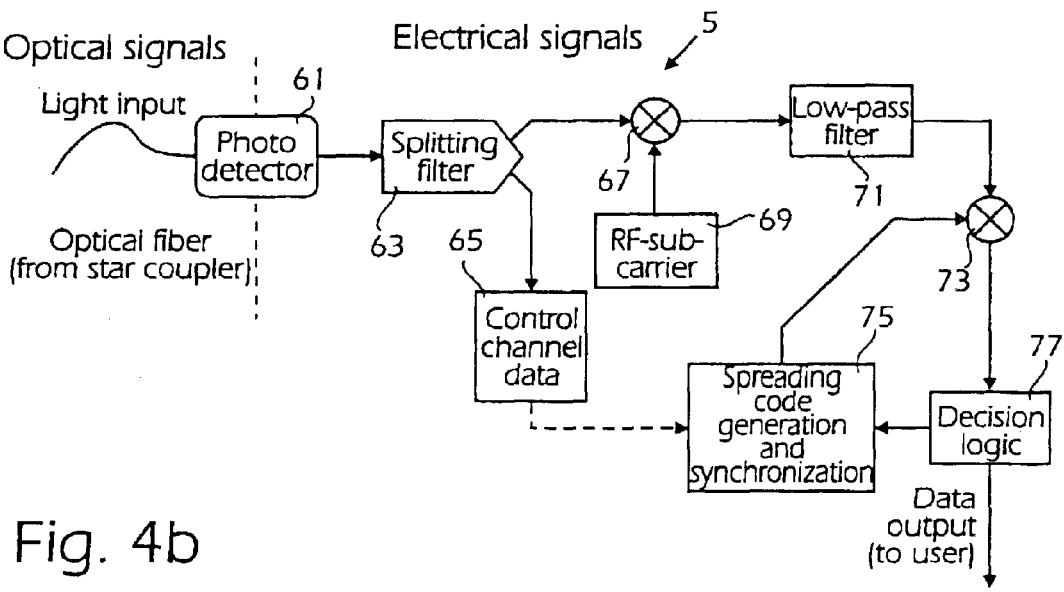

In the basic system having only a control channel and only one data channel only one subcarrier is used on which the spread-spectrum data signal is modulated or by which the spread-spectrum data signal is multiplied, see FIGS. 1a, 1b and the block diagrams of transmitter and receiver circuits in FIGS. 4a, 4b. Instead, the control channel can be modulated on the subcarrier, see FIGS. 2a, 2b and the block diagrams of transmitter and receiver circuits in FIGS. 5a, 5b.

The block diagrams of transmitter and receiver circuits in FIGS. 4a, 4b respectively for the case of having the control channel in the baseband illustrate only the principle of operation of the respective circuits. Some additional filters, amplifiers and control circuits may be needed in a practical embodiment but they can easily be introduced therein by one skilled in the art.

In the transmitter circuit 3 illustrated in FIG. 4a the incoming data signal, which uses amplitude modulation and is a common pulse train having the logical levels "+1" and "−1" representing the two binary digits 1 and 0, is spectrum spread by being multiplied by a spreading code in a multiplication circuit 41, the spreading code arriving from a spreading code generator 43 in order to perform direct sequence CDMA. The spreading code is composed of a balanced sequence of similarly the electrical logical levels "+1" and "−1" (the direct sequence CDMA being equivalent to a π or 180° phase modulation). The result is filtered in a low-pass filter 45 and then used to modulate an RF subcarrier produced in an RF generator 47 by providing the code-spread signal from the filter 45 and the RF signal from the generator 47 to a multiplication circuit 49. The output signal of the multiplication circuit 49 is provided to a summing or adding circuit 51, in which it is added to a control signal, also being a pulse train of the amplitude modulated type, generated in a control unit 53. The electrical sum of the signals is fed to a light emitting device 55 in which it is used for modulating the intensity of a monochromatic light wave generated in the light emitting device. The resulting modulated light signal is then forwarded on the optical fiber connected to the output of the light emitting device 55.

The receiver circuit 5 illustrated in FIG. 4b comprises a photodetector 61, which is connected to an optical fiber from the coupler 7, see FIG. 3, for receiving light signals propagating on the fiber. The photodetector 61 can be a light sensor of some common type sensing the optical power and converting it to corresponding electrical signals. The electrical signal is provided to a splitting filter 63, which on a first one of its outputs produces a low-frequency portion of the electrical which is directly the control data signal and on a second one of its outputs produces a high-frequency portion comprising the modulated RF wave. The control data is provided to a control unit 65 and the RF wave must then be demodulated. Then, it is first multiplied in a multiplication circuit 67 by a non-modulated RF wave generated in an oscillator 69 having the same frequency as the RF wave generated by the RF generator 47 in the transmitter. The multiplied or mixed signal is then filtered in a low-pass filter 71 from which it is provided to a second multiplication circuit 73, which on another input receives the spreading code from a unit 75 for spreading code generation and synchronization. The output signal of the multiplication circuit 73 is fed to a decision unit 77 containing logical circuits for deciding whether the received signal contains a "one" or a "zero" in the conventional way. The output signal of the decision unit 77 is the desired electrical data signal transmitted through the network and is delivered in some way to the user of the terminal. This output signal is also supplied to the spreading code generation and synchronization unit 75 in order to allow it to make the synchronization.

Figure 5A:
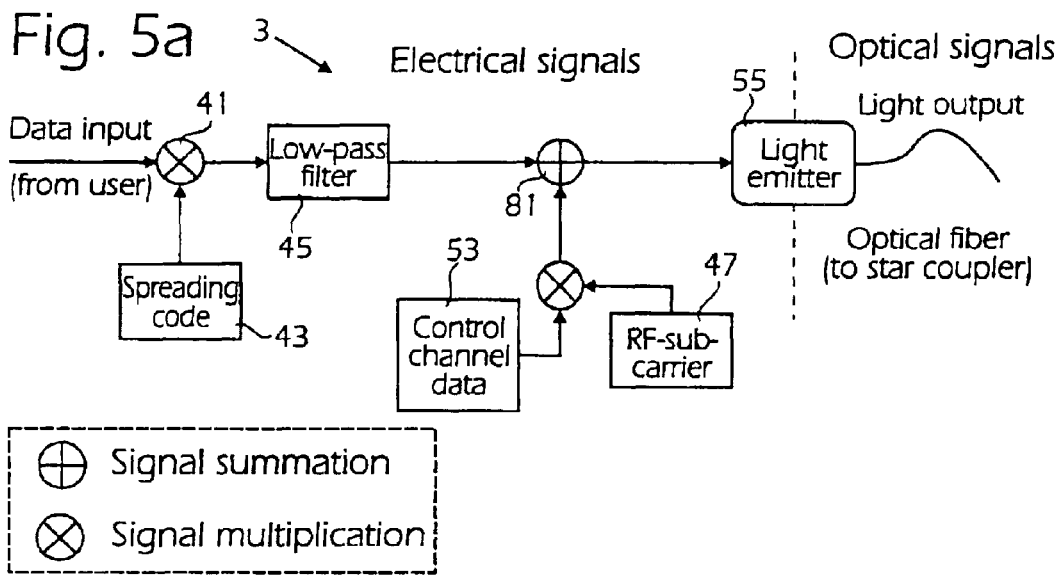
FIGS. 5a and 5b are schematic block diagrams of the principle of operation of a transmitter and a receiver respectively for a simple, basic system having a CDMA data channel in the baseband.
Figure 5B:
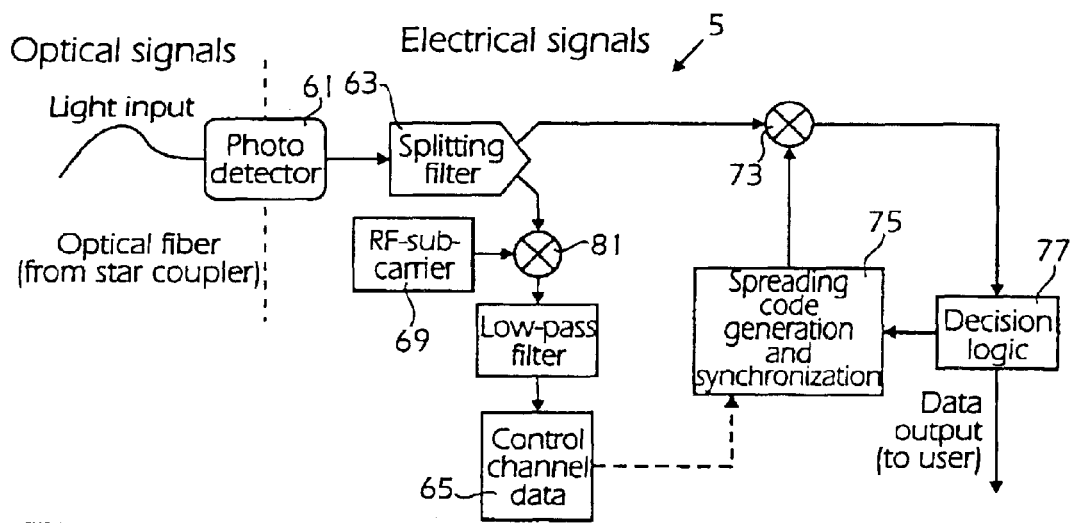

The basic system can instead, as has been described above, comprise modulation of the control channel and block diagrams of transmitter and receiver circuits for this case are shown in FIGS. 5a and 5b respectively. In the same way as for the transmitter and receiver circuits described above the block diagrams of FIGS. 5a and 5b illustrate only the principle of operation of the respective circuits. Additional filters, amplifiers and control circuits may actually be needed. In FIGS. 5a and 5b the same reference numerals as in FIGS. 4a and 4b are used for identical or corresponding elements.

The transmitter circuit 3 of FIG. 5a spreads the data signal incoming from the user by multiplying it with a spreading code in a multiplication circuit 41, which receives the data signal on one input and the spreading code on another input from a spreading code generator 43 as described above. The spread signal is low-pass filtered in a filter 45, which provides the filtered signal to an input of a summing or adding circuit 81. A control signal is as above generated in a control unit 53 and is modulated on an RF subcarrier produced in an RF generator 47 by providing the control signal and the RF signal from the generator 47 to a multiplication circuit 83. The output signal of the multiplication circuit 83 is provided to another input of the summing circuit 81, in which it is added to the code-spread, filtered data signal. The sum produced in the circuit 81 is fed to a light emitting device 55 for modulating a light wave generated by the light emitting device. The resulting modulated light signal is then as above forwarded on the optical fiber connected to the output of the light emitting device 55.

The receiver circuit 5 illustrated in FIG. 5b comprises like that shown in FIG. 4a a photodetector 61, which is connected to an optical fiber extending from the coupler 7, see FIG. 3. The electrical signal produced by the detector 61 is provided to a splitting filter 63, which on a first one of its outputs produces a low-frequency portion of the electrical signal which directly is the code-spread data signal and on a second one of its outputs produces a high-frequency portion of the electrical signal which comprises a modulated RF wave containing the control data signal which will be demodulated. The high-frequency signal is then first multiplied in a multiplication circuit 85 by a non-modulated RF wave generated in an oscillator 69 having the same frequency as the RF wave generated in the transmitter. The multiplied signal is then filtered in a low-pass filter 87 from which it is provided to a control unit 65. The code-spread data signal is "despread" by supplying it in the same way as described above to an input of a multiplication circuit 73, which on another input receives the spreading code from a spreading code generation and synchronization unit 75. The output signal of the multiplication circuit 73 is provided to a decision unit 77. The output signal of the decision unit is the desired electrical data signal and it is also supplied to the spreading code generation and synchronization unit 75 in order to allow it to make the synchronization.

Now the band-width requirements for the different cases will be discussed. The minimum frequency of the modulated RF subcarrier should always be higher than the chip rate, i.e. than the bit-rate of the spreading code. If we put the control channel on an RF subcarrier, its minimum frequency should still be higher than the chip-rate.

The chip rate depends on the desired bit-rate and the maximum number of users or terminals 1 which are to be allowed to be connected to the network. The maximum number of terminals depends on the number of code sequences available and thus on the length of the code sequence. Typically, in a direct sequence CDMA system, the ratio of the chip-rate to the bit-rate of the incoming data signal is equal to the length of the code sequence, i.e. the number of bits in the code sequence. The (useful) bandwidth of the spread signal is of the order of the chip rate.

This means that the subcarrier RF frequency must be higher than the chip rate in the case as illustrated in FIGS. 4a and 4b in which a control channel in the baseband is used. For example, for a signal bit-rate of 2 Mbits/s and a code sequence of 127 bits, the chip rate should be of the order of 250 MHz. A subcarrier frequency of 300 MHz can then be used which gives a signal spectrum between 50 and 550 MHz and leaves more space than required for a baseband control channel of 10 Mbits/s which will occupy only about 10 MHz.

Alternatively, if we keep the spread data signal in the baseband, we can still use a subcarrier of 300 MHz for the control channels. But now, the spectrum will extend only to about 310 MHz. Thus, putting the control channel on the subcarrier allows smaller total spectral widths.

The number of users which can be accommodated by such a system depends on the code sequences used, which, as has been intensively discussed in the prior art, must have a sharp auto-correlation peak one chip wide for allowing a synchronization to be made in the spreading code generation and synchronization units 75 and a low cross-correlation, in order to get a good interference rejection. Well-known standard codes comprise M-sequences, Gold-codes and Kasami-codes, which can all be generated using shift-registers provided with feedback taps. For example, using Gold-codes, which are generated using two shift-registers of length n, ($2^n+1$) code sequences of length N=($2^n-1$) can be obtained m where n cannot be a multiple of 4. In that case the auto-correlation value is equal to N for no shift and equal to −1 otherwise. The maximum cross-correlation value between different code sequences is ($2^{[(n+2)/2]}+1$). For example a code sequence of 127 bits can be generated with n=7, which gives 129 distinct code sequences, an auto-correlation peak of 127 and a maximum cross-correlation of 17.

The control channel for establishing connections between two terminals can be implemented as a TDMA channel using collision detection using for example an "Ethernet" type protocol. Other methods, such "Token Ring", can also be used. Typically, amplitude modulation will be used. An outline of a protocol sequence to establish two-way communication between two terminals could be the following:

1. If a terminal A wants to establish a communication channel to another terminal B, it sends a connection request over the control channel, the request being generated by the control unit 53 of the terminal A. It can also send the code sequence which it will use if it is not known to the terminal B.

2. Terminal A waits for a reply from terminal B and sends the request again at random intervals if B does not respond.

3. The answer from terminal B either refuses the connection if this terminal is busy or tells terminal A that it can begin transmission. If needed, terminal B can also send the code sequence which it will use for transmission over a return channel.

The code sequences of the transmitters of each terminal can be fixed and known to all the other terminals, or in order to simplify management, they can be transmitted in the control channel during each connection setup process. This latter method requires that the spreading code in the receivers can be programmed. This allows for broadcast transmissions, i.e. that one terminal sends the same data to a plurality of other terminals. Alternatively, the receiver codes could be fixed and the transmitters be programmable, but this would not allow broadcast.

The light emitting devices 55 used in the transmitters 3 must have a sufficient bandwidth to transmit the amplitude modulated signal. Depending on the bandwidth and power requirements, these devices can be for example light emitting diodes (LEDs), directly modulated semiconductor lasers or lasers comprising a modulator. There is no requirement on wavelength control of the light emitting devices, since all the processing is done in the electrical domain. As has already been indicated, the photodetectors 61 in the receivers 5 will sum the light power at all relevant wavelengths. This allows for example the use of cheap Fabry-Perot lasers which are multi-mode.

As described in conjunction with FIG. 3, the light generated by all light emitting devices 55 in the transmitters 3 is coupled to each other and split among the fibers connected to the receivers 5 in some means which for example is a star coupler as illustrated in FIG. 3. If the power budget is insufficient, it may be necessary to use optical amplifiers for some of the fibers but this is generally expensive.

A straightforward extension of the basic system is to add several subcarriers for the communication channels in order to obtain a single connection having multiple RF subcarriers. The only difference from the basic systems as described with reference to FIGS. 1a, 1b, 4a, 4b and FIGS. 2a, 2b, 5a, 5b respectively is that the transmitter and/or receiver are designed to select the correct subcarrier. The information on the subcarrier which is to be used can be exchanged through the control channel during setup of the connections. Different bit-rates and code lengths can be used for different subcarriers. For example, if we require much fewer high bandwidth connections than lower bandwidth ones, we could use smaller code lengths, which allow a smaller number of users, and reduce the spectral bandwidth used. It should be observed, that the two directions in a bi-directional connection can use different subcarriers, which would allow asymmetric bandwidths, so that one direction can have much more bandwidth that the opposite direction.

The codes for the high bandwidth channels can be allocated dynamically when needed, for example by a central network manager, not shown, which would allow reuse and more terminals than codes.

To eliminate the need for tuning at one end of a connection, either the transmitter or receiver could use a fixed subcarrier. This would be practical mainly if all connections had the same bit-rate. However, using modern electronic circuits, the difference in costs would be very small and probably not worth the resulting loss of flexibility.

As an example, to the system described previously, using a control channel of 10 Mbits/s on a 300 MHz subcarrier and baseband channels of 2 Mbits/s, having a code length of 127 bits, a subcarrier at 650 MHz can be added, carrying channels of 10 Mbits/s having a code length of 31 bits. This would give 33 high-speed channels and extend the total spectrum used to about 960 MHz.

When multiple subcarriers are arranged, it is possible to have simultaneous connections from one terminal to a number of different terminals (the number ranging up to the number of RF subcarriers) so that a case here called multiple connections having multiple RF subcarriers is obtained. Of course this results in that more hardware is required. As many "spreader+modulator" in the transmitter 3 and "demodulator+despreader" in the receiver 5 are needed as the number of allowed connections. If their number is the same as the number of subcarriers, they do not have to be tunable.

The control channel can still be implemented in the same way as above. An example of a transmitter and a receiver allowing two simultaneous connections is illustrated by the block diagrams of FIGS. 6a and 6b. As for the transmitter and receiver circuits described in conjunction with FIGS. 4a, 4b and 5a, 5b these block diagrams illustrate only the principle of operation of the respective circuits. In FIGS. 6a and 6b the same reference numerals as in the previously described figures are used for denoting identical or corresponding elements.

In the transmitter circuit for two RF subchannels illustrated in FIG. 6a two different data signals are individually code-spread by multiplying them with individual spreading codes in multiplication circuits 41, which each one receives a data signal on one input and the respective spreading code on another input from spreading code generators 43. Each code-spread signal is low-pass filtered in a respective filter 45. Each filtered signal is then used to modulate a different RF subcarrier produced in tunable RF generators 47' by feeding the code-spread signal from the filter 45 and the RF signal from the respective tunable generator 47' to a separate multiplication circuit 49 arranged for each incoming data signal. The output signals of the multiplication circuits 49 are provided to a summing circuit 51', in which they are they are added to each other and to a control signal generated by a control unit 53 for the transmitter. The electrical sum of the signals is fed to a light emitting device 55 in order to modulate a light wave issued on an optical fiber.

The corresponding receiver circuit for two RF subchannels illustrated in FIG. 6b comprises a photodetector 61, which is connected to an optical fiber for receiving light signals. The electrical signal produced by the detector is provided to a splitting filter 63, which on a first one of its outputs delivers the low frequency portion of the signal which directly is the control data signal and on a second one of its outputs delivers the high frequency portion comprising the modulated RF waves. The control data is provided to a control unit 65 for the receiver. The high frequency portion of the detected signal containing the RF waves must then be demodulated for the two carriers. Then, the high frequency portion is first multiplied in two parallel multiplication circuits 67 by corresponding non-modulated RF waves. Each of these RF waves is generated by a tuneable oscillator 69' tuned to generate the same frequency as the RF wave generated by the corresponding RF generator 47' in the transmitter. Each multiplied or mixed signal is then filtered in a low-pass filter 71, one filter being arranged for each signal, from which filter the mixed signal is provided to an input of another multiplication circuit 73, which on another input receives the respective spreading code from a unit 75 for spreading code generation and synchronization for each RF channel and data signal. The output signal of the multiplication circuit 73 is fed to a decision unit 77 providing an output signal being the respective, desired electrical data signal delivered to the user of the terminal. This output signal is as above also supplied to the spreading code generation and synchronization unit 75 in order to allow it to make the synchronization.

Figure 7:
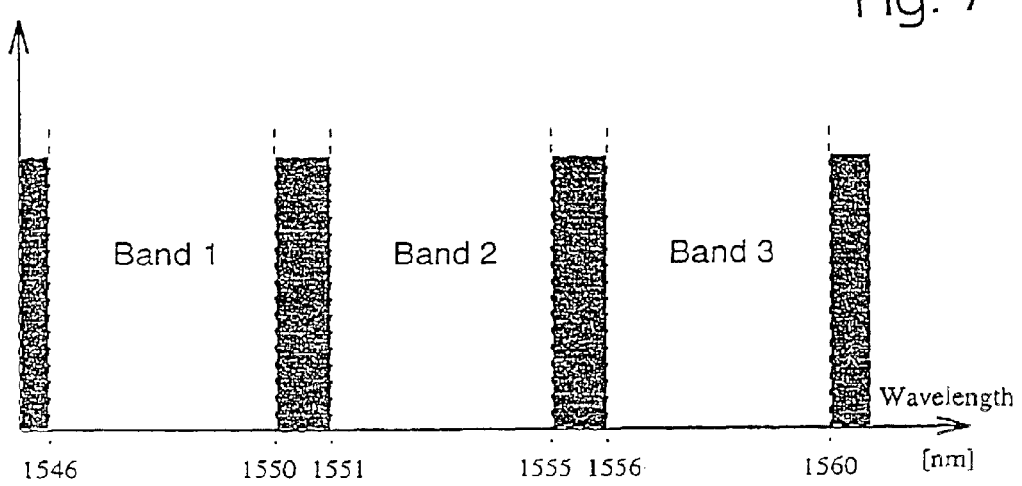
FIG. 7 is a diagram showing an example of optical spectrum allocation for 3 WDM bands, each 4 nm wide with 1 nm guard bands in between, around 1550 nm.

The capacity of the basic systems having one RF subcarrier or the system having multiple RF subcarriers can be significantly extended by using WDM techniques. Then the optical spectrum is divided in several wavelength bands which can be used independently, see FIG. 7. In FIG. 7 a diagram is shown illustrating an example of optical spectrum allocation around 1550 nm for three WDM bands, each of which being 4 nm wide, where guard bands of 1 nm are arranged between the WDM bands. The information for setting up a connection can include also the wavelength band to be used when transmitting data.

In this case, tunable light emitting devices and tunable bandpass filters having sufficient wavelength accuracy to stay in the desired band will be required. The accuracy which the light emitting devices and the filters are required to have will then depend on the width of the wavelength bands. Such a system will in general be more expensive than the systems described above, but would increase the capacity by a factor equal to the number of wavelength bands used. If WDM is used, it may be interesting to fix the wavelength band used by the transmitter or the receiver in order to decrease the costs by replacing either the tunable light emitting device or the tunable filter by a fixed or non-tunable one. At the expense of even more hardware, simultaneous connections in different wavelength bands is also possible using wavelength demultiplexers and/or filters. Again, if the system is to allow broadcast transmissions, the filter/filters at the receiver must be tunable.

The control channel can still be implemented in the same way as before by omitting putting an optical filter in front of the control channel photo-detector. An alternative is to allocate an own (fixed) wavelength band to the control channel.

Signal interferences will now be discussed. There are substantially three ways, in addition to the normal cross-correlation between code sequences, in which two different signals can interfere with each other. They comprise:

(1) beating between two optical carriers with a beat frequency within the electrical bandwidth of the receiver;

(2) non-linear mixing in the light emitter generating sum and difference terms;

(3) non-linear mixing in the receiver.

The problem of beat interference between optical carriers can arise if the optical carrier frequencies of two lasers become close enough so that the difference is within the electrical bandwidth of the receiver, whereas, if it is larger, it will be filtered out. This will be a problem mainly in the case where single mode lasers are used. If LEDs are used, there is no coherent beating. If multimode Fabry-Perot lasers are used, the problem can still exist, but in general only one or a few modes will be involved, which reduces the power of the beat tone because only a small fraction of the light power is involved. One way to avoid the problem is to use self-pulsating lasers, of the type used in CDs for example. The only requirement is that the self-pulsation frequency should be at least twice the highest frequency of the signal to be transmitted.

Even if we get a beat tone, the fact that we use CDMA will reduce its effect significantly since the despreading in the receiver will spread the beat tone and reduce its in-band power by about the spreading factor. The remaining power will appear as more or less white noise. This is not true for the control channel which is not spread-spectrum, but this channel has a very narrow spectrum, at most a few tens of MHz, and will require an exact coincidence of the optical carriers. This can still happen, especially when there is a large number of terminals, which is the reason of the advantageous use of LEDs or multi-mode lasers or self-pulsating lasers.

Non-linearities in the light emitting devices mainly originate from a light-current (L-I) relation which is non-linear. This non-linearity can in general be made small for lasers but is significant for LEDs. Because the signals are spread by the CDMA coding, the most likely source of sum and difference terms is the non-linear mixing of the RF subcarriers with one another, if several subcarriers are used, and with the control channel. This will give narrow intermodulation tones. By a careful choice of the RF subcarrier frequencies, it can be avoided that they appear in the control channel band. When they appear in the band of one of the spread spectrum signals, the despreading in the receiver will spread them and reduce the in-band power by the spreading factor, as for the optical carrier beating mentioned above. Again, the remaining power will appear as white noise. This will significantly reduce the linearity requirements of the light emitting devices.

In general, non-linearities in the receivers are small compared to those in the light emitting devices and can be ignored. In any case, the same factors which reduce the effects of non-linearities in light emitting devices will also reduce them in receivers.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A method of transferring an electrical digital signal from a first terminal on an optical fiber to a second terminal, the electrical digital signal incoming to the first terminal, the method comprising the sequential steps of:

spreading the electrical digital signal using a spread spectrum method to produce a spread electrical signal;

modulating the spread electrical signal on a subcarrier of a radio frequency to produce a modulated electrical signal of a first frequency range around the radio frequency of the subcarrier;

adding a control digital signal of a second frequency range comprising control information to the modulated electrical signal to provide a sum signal, frequencies of the first frequency range being higher than frequencies of the second frequency range;

converting the sum signal to an optical signal;

transmitting the optical signal on the optical fiber to the second terminal to be received in the second terminal as a received optical signal; and performing in the second terminal inverse operations on the received optical signal to provide signals corresponding to the electrical digital signal and to the control digital signal.

2. The method of claim 1, comprising the additional step of low-pass filtering the spread electrical signal before modulating.

3. A method of transferring an electrical digital signal, incoming to a first terminal, from the first terminal on an optical fiber to a second terminal, the method comprising the sequential steps, performed in the first terminal, of:

spread spectrum modulating the electrical digital signal to produce a spread spectrum modulated electrical signal;

modulating the spread spectrum modulated electrical signal on a subcarrier of a radio frequency to produce a modulated subcarrier signal of a first frequency range around the radio frequency of the subcarrier;

adding a control digital signal comprising control information to the modulated subcarrier signal;

using the modulated subcarrier signal for modulating a monochromatic light wave to produce a modulated light wave; and transmitting the modulated light wave on the optical fiber to the second terminal;

the method comprising the further sequential steps, performed in the second terminal, of:

receiving the modulated light wave on the optical fiber;

converting the modulated light wave received on the optical fiber to a converted electrical signal;

filtering the converted electrical signal splitting it into a high frequency portion and a low frequency portion, the low frequency portion comprising a signal corresponding to the control digital signal;

demodulating the high frequency portion of the converted electrical signal at the radio frequency to produce a demodulated spread spectrum electrical signal;

spread spectrum demodulating the demodulated spread spectrum electrical signal to produce a digital electrical signal corresponding to the electrical digital signal incoming to the first terminal.

4. The method of claim 3, comprising the additional step of low-pass filtering the spread electrical signal before modulating.

5. A method of transferring an electrical digital signal from a first terminal on an optical fiber to a second terminal, the electrical digital signal incoming to the first terminal, the method comprising the sequential steps of:

modulating a first one of a control digital signal, the control digital signal comprising control information used for controlling the electrical digital signal, and the electrical digital signal on a radio frequency subcarrier to provide a first modulated signal having the frequency of said radio frequency subcarrier;

modulating a second one of the control digital signal and the electrical digital signal, the second one being different from the first one, using a spread-spectrum method on a different one of radio frequency subcarriers to provide a second modulated signal having the frequency of said different one of radio frequency subcarriers;

adding the first and second modulated signals to provide a sum signal;

converting the sum signal to an optical signal;

transmitting the optical signal on the optical fiber to the second terminal to be received in the second terminal as a received optical signal; and performing, in the second terminal, inverse operations on the received optical signal to provide signals corresponding to the electrical digital signal and to the control digital signal.

6. The method of claim 5, wherein in the step of modulating a first one or in the step of modulating a second one the radio frequency subcarrier used for modulating comprises a baseband.

7. The method of claim 5, wherein, in the step of modulating the first one, the first one is modulated using TDMA.

8. The method of claim 5, wherein, in the step of modulating the second one, the second one is modulated using CDMA.

9. A network comprising at least two terminals connected by an optical fiber, a first one of the at least two terminals comprising:

spreading means to spread a first electrical digital signal using a spread spectrum method to produce a spread signal;

modulating means connected to the spreading means for receiving the spread signal and arranged to modulate the spread signal on a radio frequency subcarrier having a non-zero frequency to produce a modulated electrical signal of a first frequency range around the radio frequency of the subcarrier;

adding means connected to the modulating means for receiving the modulated electrical signal and arranged to add to the modulated electrical signal a second electrical digital signal of a second frequency range to produce a sum signal, frequencies of the first frequency range being higher than frequencies of the second frequency range; and converting means connected to the adding means for receiving the sum signal, connected to the optical fiber and arranged to convert the sum signal to an optical signal and to transmit the optical signal on the optical fiber.

10. The network of claim 9, wherein the non-zero frequency is a relatively high frequency.

11. The network of claim 9, wherein a second one of the at least two terminals comprises:

converting means connected to the optical fiber for receiving the optical signal transmitted on the optical fiber from the first one of the at least two terminals and arranged to convert a received optical signal to a converted electrical signal;

filtering means connected to the converting means for receiving the converted electrical signal and arranged to filter the converted electrical signal splitting it into a high frequency portion and a low frequency portion, the low frequency portion comprising a signal corresponding to the second electrical digital signal;

radio frequency demodulating means connected to the filtering means for receiving the high frequency portion of the converted electrical signal and arranged to demodulate the high frequency portion of the converted electrical signal at the radio frequency to produce a demodulated spread spectrum electrical signal; and spread spectrum demodulating means connected to the radio frequency demodulating means for receiving the demodulated spread spectrum electrical signal and arranged to spread spectrum demodulate the demodulated spread spectrum electrical signal to produce a digital electrical signal corresponding to the first electrical digital signal.

12. The network of claim 9 further comprising a low-pass filter connected between the spreading means and the modulating means to low-pass filter the spread signal.

13. A network comprising at least two terminals connected by an optical fiber, a first one of the at least two terminals comprising:

spreading means to spread a first electrical digital signal using a spread spectrum method to produce a spread signal of a first frequency range;

modulating means to modulate a second electrical digital signal on a radio frequency subcarrier having a non-zero frequency to produce a modulated electrical signal of a second frequency range around the radio frequency of the subcarrier, frequencies of the first frequency range being lower than frequencies of the second frequency range;

adding means connected to the spreading means for receiving the spread signal and to the modulating means for receiving the modulated electrical signal and arranged to add the spread electrical signal and the modulated electrical signal to each other to produce a sum signal; and converting means connected to the adding means for receiving the sum signal, connected to the optical fiber and arranged to convert the sum signal to an optical signal and to transmit the optical signal on the optical fiber.

14. The network of claim 13, wherein a second one of the at least two terminals comprises:

converting means connected to the optical fiber for receiving the optical signal transmitted on the optical fiber from the first one of the at least two terminals and arranged to convert a received optical signal to a converted electrical signal;

filtering means connected to the converting means for receiving the converted electrical signal and arranged to filter the converted electrical signal splitting it into a high frequency portion and a low frequency portion;

radio frequency demodulating means connected to the filtering means for receiving the high frequency portion of the converted electrical signal and arranged to demodulate the high frequency portion of the converted electrical signal at the radio frequency to produce a demodulated electrical signal corresponding to the second digital electrical signal; and spread spectrum demodulating means connected to the filtering means for receiving the high frequency portion of the converted electrical signal and arranged to spread spectrum demodulate the high frequency portion of the converted electrical signal to produce a digital electrical signal corresponding to the first electrical digital signal.

15. The network of claim 13 further comprising a low-pass filter connected between the spreading means and the adding means to low-pass filter the spread signal.

16. A method of transferring an electrical digital signal from a first terminal on an optical fiber to a second terminal, the electrical digital signal incoming to the first terminal, the method comprising the sequential steps of:

in the first terminal;

spreading the electrical digital signal using a spread spectrum method to produce a spread electrical signal;

modulating the spread electrical signal on a subcarrier of a radio frequency to produce a modulated electrical signal of a first frequency range around the radio frequency of the subcarrier;

adding a control digital signal of a second frequency range comprising control information to the modulated electrical signal to provide a sum signal, frequencies of the first frequency range being higher than frequencies of the second frequency range, converting the sum signal to an optical signal, transmitting the optical signal on the optical fiber to the second terminal to be received in the second terminal as a received optical signal, and in the second terminal;

converting the received optical signal to a converted electrical signal, filtering the converted electrical signal splitting it into a high frequency portion and a low frequency portion, the high frequency portion comprising a signal corresponding to the electrical digital signal and the low frequency portion comprising a signal corresponding to the control digital signal, performing operations inverse of those performed in the first terminal on the high frequency portion and the low frequency portion of the converted optical signal to provide signals corresponding to the electrical digital signal and to the control digital signal.

17. A network comprising at least two terminals connected by an optical fiber, wherein a first one of the at least two terminals comprises:

spreading means to spread a first electrical digital signal using a spread spectrum method to produce a spread signal, modulating means connected to the spreading means for receiving the spread signal and arranged to modulate the spread signal on a radio frequency subcarrier having a non-zero frequency to produce a modulated electrical signal of a first frequency range around the radio frequency of the subcarrier, adding means connected to the modulating means for receiving the modulated electrical signal and arranged to add to the modulated electrical signal a second electrical digital signal of a second frequency range to produce a sum signal, frequencies of the first frequency range being higher than frequencies of the second frequency range, and converting means connected to the adding means for receiving the sum signal, connected to the optical fiber and arranged to convert the sum signal to an optical signal and to transmit the optical signal on the optical fiber, and a second one of the at least two terminals comprises:

converting means connected to the optical fiber for receiving the optical signal transmitted on the optical fiber from the first one of the at least two terminals and arranged to convert a received optical signal to a converted electrical signal, and filtering means connected to the converting means for receiving the converted electrical signal and arranged to filter the converted electrical signal splitting it into a a low frequency portion, the high frequency portion comprising a signal corresponding to the first electrical digital signal and the low frequency portion comprising a signal corresponding to the second electrical digital signal.

18. The network of claim 17, wherein the second one of the at least two terminals further comprises:

radio frequency demodulating means connected to the filtering means for receiving the high frequency portion of the converted electrical signal and arranged to demodulate the high frequency portion of the converted electrical signal at the radio frequency to produce a demodulated spread spectrum electrical signal, and spread spectrum demodulating means connected to the radio frequency demodulating means for receiving the demodulated spread spectrum electrical signal and arranged to spread spectrum demodulate the demodulated spread spectrum electrical signal to produce a digital electrical signal corresponding to the first electrical digital signal.

* * * * *